United States Patent
Main et al.

(10) Patent No.: US 6,497,071 B1
(45) Date of Patent: Dec. 24, 2002

(54) CHRISTMAS TREE SELF-WATERING SYSTEM

(76) Inventors: Byron Main, 4921 Forest Creek Way, Granite Bay, CA (US) 95746; Vicki Main, 4921 Forest Creek Way, Granite Bay, CA (US) 95746

( * ) Notice: Subject to any disclaimer, the term of this patent is extended or adjusted under 35 U.S.C. 154(b) by 0 days.

(21) Appl. No.: 09/660,154

(22) Filed: Sep. 12, 2000

(51) Int. Cl.⁷ .......................... A47G 33/12; A47G 7/02
(52) U.S. Cl. .......................... 47/40.5; 47/79
(58) Field of Search .................. 47/40.5, 48.5, 47/79; 11/129, 130.1; 248/519; 73/861, 170.1

(56) References Cited

U.S. PATENT DOCUMENTS

| | | | | |
|---|---|---|---|---|
| 3,469,342 A | * | 9/1969 | Morris | |
| 4,825,587 A | * | 5/1989 | Stancil | 47/40.5 |
| 4,930,252 A | * | 6/1990 | Krause et al. | 47/40.5 |
| 5,076,009 A | * | 12/1991 | Cibor | 47/40.5 |
| 5,157,868 A | * | 10/1992 | Munoz | 47/40.5 |
| 5,201,140 A | * | 4/1993 | Voorhis | 47/40.5 |
| 5,217,696 A | * | 9/1993 | Wolverton et al. | 422/121 |
| 5,369,910 A | * | 12/1994 | Copenhaver | 47/40.5 |
| 5,513,677 A | * | 5/1996 | McCurry | 141/1 |
| D375,026 S | * | 10/1996 | Ronald | D8/1 |
| 5,791,082 A | * | 8/1998 | Finello | 47/40.5 |
| 5,857,484 A | * | 1/1999 | Davidian | 137/454 |
| 5,937,574 A | * | 8/1999 | Jacques | 47/40.5 |
| 5,966,864 A | * | 10/1999 | Flink | 47/40.5 |

FOREIGN PATENT DOCUMENTS

DE    3421733 A1 * 12/1985 .......... A47G/33/12

* cited by examiner

Primary Examiner—Charles T. Jordan
Assistant Examiner—Andrea Valenti
(74) Attorney, Agent, or Firm—Mark C. Jacobs

(57) ABSTRACT

An improved watering system for a Christmas tree which is mounted for sale or displayed in a commercial stand which defines a water retaining basin, the system being remotely located relative to the tree, and which system employs a water resistant container disguised as a Christmas gift, with a vessel to be filled with water removably disposed inside of the container. The vessel and optionally the container each having a water level indicator.

6 Claims, 3 Drawing Sheets

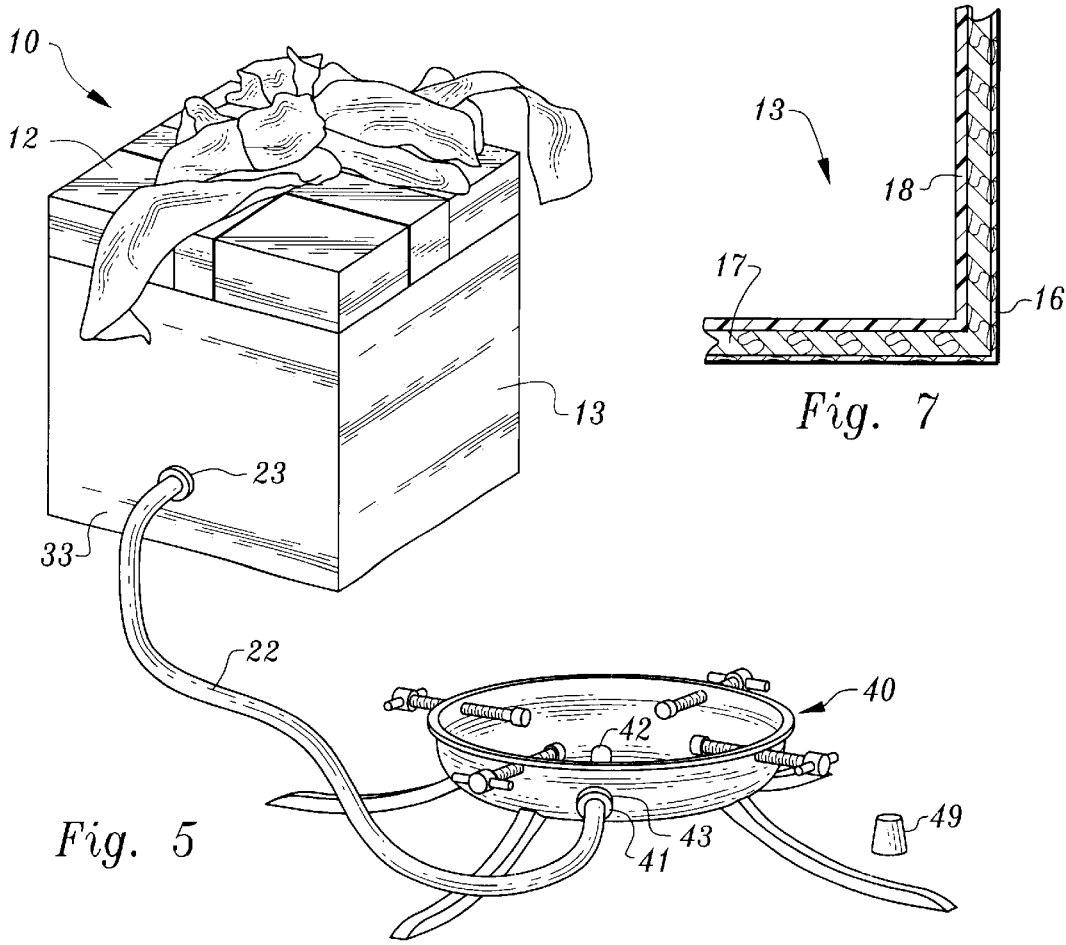
Fig. 5
Fig. 7
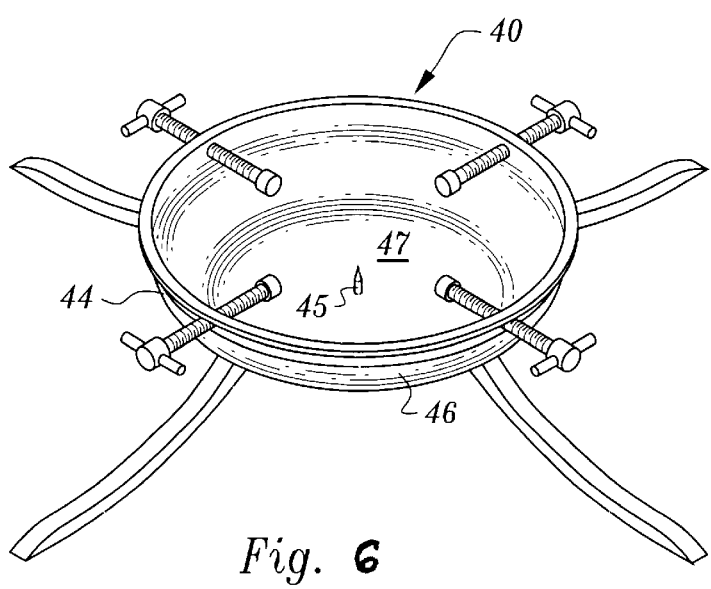
Fig. 6

US 6,497,071 B1

CHRISTMAS TREE SELF-WATERING SYSTEM

FIELD OF THE INVENTION

This application relates to commercial Christmas tree stands and a remote watering system for the trees sold therein.

BACKGROUND OF THE INVENTION

Christmas trees are sold at commercial lots generally in a bundt cake pan configured tree stand that basically defines a basin for water retention. That is, the holder is a basin generally having a flat base and an integrated upstanding circular sidewall. An upstanding metal pointed peg upon which the tree trunk is impaled is centrally disposed in the base. The transition from the base to the sidewall may be a relatively large radius or a mere chamfer curve of a small extension.

There have been prior art attempts to provide remote watering systems to avoid the drying out of the trees to thus reduce the potential fire danger of the Christmas tree. These prior art units were located in a patent search. Thus applicant is cognizant of the following patents:

| | |
|---|---|
| Cibor | U.S. Pat. No. 5,076,009 |
| Davidian | 5,857,484 |
| Voorhis | 5,201,140 |
| Jacques | 5,937,574 |
| Copenhaver | 5,369,910 |
| Ronald | U.S. Design 375,026 |

Specifically this invention is an improvement to the remote watering system of the Copenhaver patent. While these and other patents may relate to the use of a remote watering system for an in-use tree watering system, there are indeed significant benefits to be obtained over the prior art from the system of this invention.

The big problem with the Copenhaver waterer is that it requires the use of a specific tree holder. We on the other hand have adapted what we have found to be the most commercially used tree stand for use with a remote watering system, which remote waterer is an improvement of the remote waterer of Copenhaver. Here too, there is no need to crawl under the tree to determine the water level in the stand. Here too a Christmas present type camouflage system for the water source is employed.

SUMMARY OF THE INVENTION

In order to accomplish our desired goals, we have provided a tree stand for the support of a Christmas tree in an upright position, in conjunction with an improved remote watering system which comprises a storage container having a water vessel disposed therein, the storage container being disguised as a Christmas present. Water can run through tubing in the vessel, through an aperture in the storage container, to the stand which has a grommeted aperture therein for receipt of the tubing. The tubing can be hidden on the floor, by a rug, cloth or other covering. A sight system is provided in the storage container and the water vessel for determining the water level in the vessel and the water level of the stand.

It is a first object of this invention to provide an improved Christmas tree watering system.

It is a second object to provide a tree watering system that advises the user when the water source for the Christmas tree needs replenishment.

It is a third object to provide a remote watering system that does not require a change in tree stands from that employed by the tree vendor.

It is another object to provide an easy to use and easy to store low cost remote watering system for Xmas trees that can be used year after year.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 5 is a perspective view of the entire remote watering system of this invention.

FIG. 6 is a top perspective view of the commercial Christmas tree stand as modified for use within this invention.

FIG. 7 is a partial sectional view of the several layers employed in the container.

SUMMARY OF THE INVENTION

An improved remote watering system for a Christmas tree mounted for sale or display in a commercial stand, which system employs a water resistant container disguised as a Christmas gift, which has a removable vessel therein to be filled with water, said vessel and optionally said container having water level indicator means. The vessel feeds water to a remotely positioned Christmas tree stand by tubing which is disposed within the stand and which tubing fluidly communicates with the vessel.

DESCRIPTION OF THE PREFERRED EMBODIMENT

Figure 1:
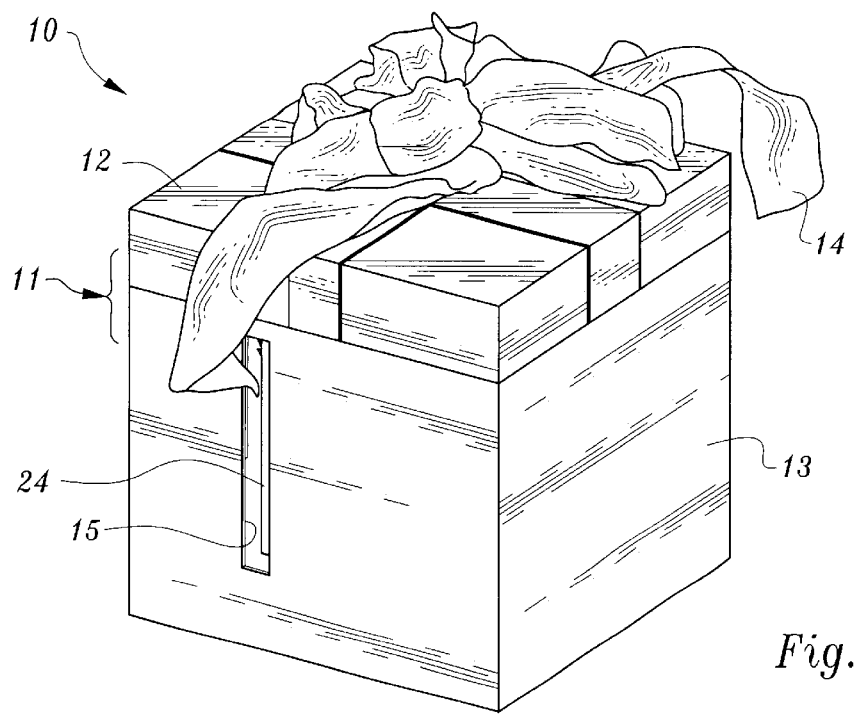
FIG. 1 is a perspective view of the Christmas tree gift storage container aspect of this invention.

In FIG. 1, there is shown the improved disguised Christmas gift main portion of this invention 10. The main portion or gift aspect includes a container 11 having a box top 12 overlaying a box bottom 13, both of which are of conventional construction, i.e., a base member with 4 walls normally disposed to the base member, and at right angles to each other, prior to modification for this invention. A bow 14 is constructed and glued into position on the top 12 of the container 11. A sight means 15 is optionally disposed within one side wall of the box bottom 13 to permit viewing of the fluid level indicator means 24, discussed below.

Figure 2:
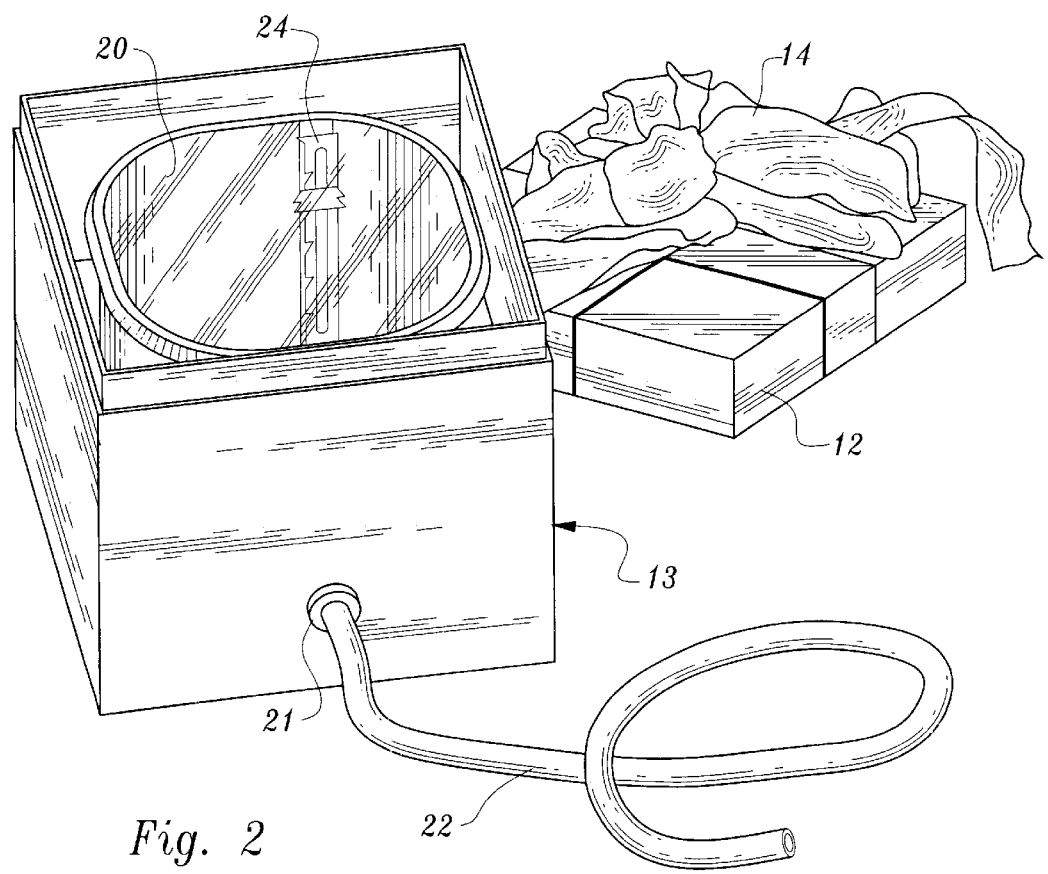
FIG. 2 is a perspective view of the container of this invention with the cover removed therefrom.

In FIG. 2, the bottom of the container 13 is seen with the top 12 laying along side. Disposed within the bottom 13 is vessel 20. Preferably the vessel is formed of plastic such as ABS, PVC or polystyrene. Seen disposed in a side wall of the container bottom 13 is grommet 21 and disposed there through is the tubing 22, not as yet at this point of time disposed in its to be used location in the Christmas tree stand. Generally the tubing also called a hose runs from about 4 to 8 feet in length and may be conventional flexible rubber or plastic.

Figure 3:
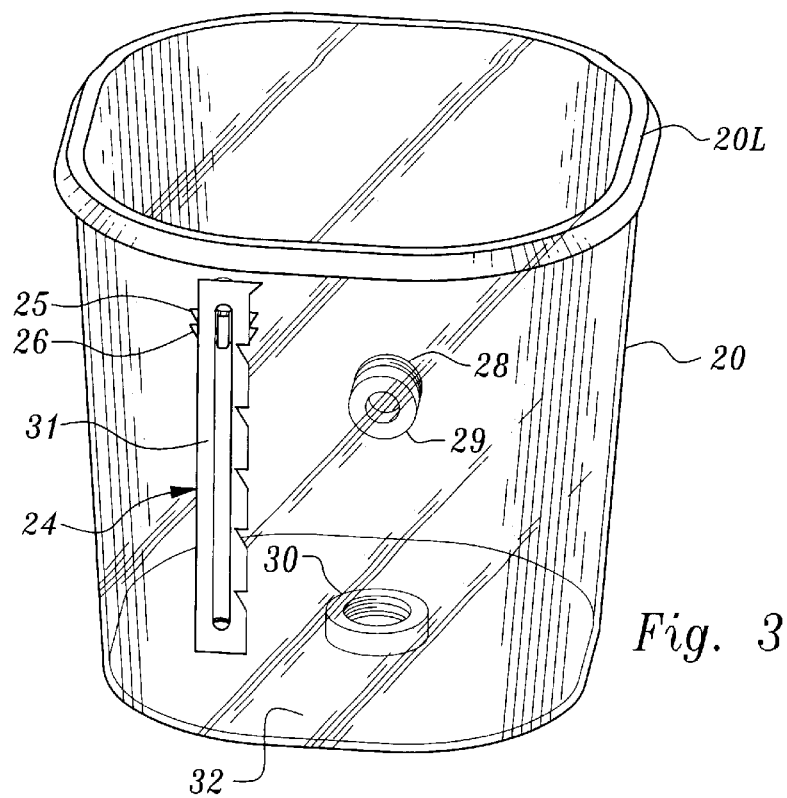
FIG. 3 is a perspective view of the vessel forming one aspect of this invention.

FIG. 3 is a perspective view of the vessel 20, having a down turned lip 20L, for easy carrying, which vessel is used for the retention of water to be distributed to the tree in the stand. Disposed in the sidewall of the vessel is a bore 28 into which has been placed an internally threaded annular member, 29, which is then glued into position. A threaded cap 30 may be threadedly engaged into the threads of the annular member 29. Also found vertically disposed in the sidewall of vessel 20 is a fluid level indicator means 24 having two moveable pointers thereon 25, 26 for noting two points on the scale 31 of the indicator means, which two points correspond to two levels of the fluid to be used for watering the Christmas tree. Discussion on water level maintenance will be recited below with respect to the section of this application dealing with the Operating Principles.

Figure 4:
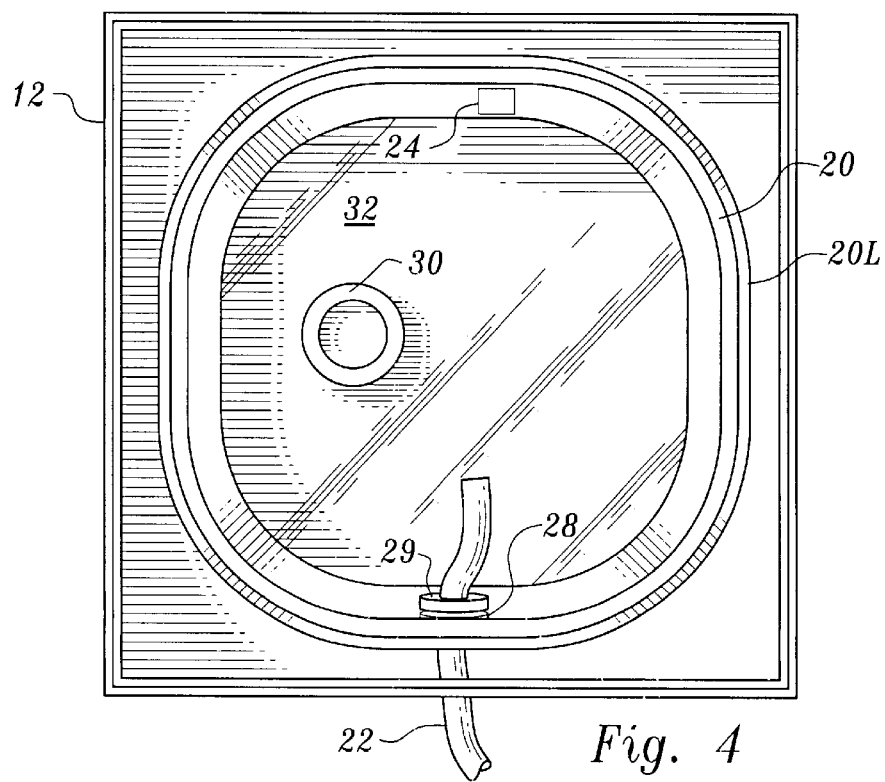
FIG. 4 is a top plan view of the vessel disposed within the container.

FIG. 4 is a top plan view which shows the disposition of the vessel within the container. The indicator means 24 and the threaded grommet 29 are also seen. The threaded plug 30 for threaded insertion into the threaded grommet 29 is seen laying on the floor 32, of the vessel. This plug is used when it is desired to use the vessel 20 for fluid storage but without delivery to another site. Otherwise it, 30 plays no function, and is not connected to floor 32.

FIG. 5 is a perspective view that illustrates the entire invention. Tubing 22 is seen extending from the grommet 21's opening 23 and extending into and through the threaded grommet 41 which is disposed in the opening 43 of the stand 40's sidewall, which wall is shown cut away for ease of understanding. Portion 42 of hose 22 is the portion that extends into the stand. The end of tubing 22 that enters the container portion 13's sidewall 33, and passes through opening 28 into the vessel's interior. See FIG. 4.

FIG. 6 is a perspective view of the typical commercial Christmas tree stand 40 which defines a basin which basin has a flat cental base 47, for disposition upon a floor or table, and a single upstanding usually circular sidewall 46. Though rectangular sidewall portions are also known and contemplated. Upstanding from the base 44, and preferably centrally located, is a pointed peg or nail 45 upon which the trunk of the tree not shown is to be impaled in a vertical position. Three or more feet attached to the sidewall 46 or the central base 47 may be employed if desired to raise the basin above floor level.

FIG. 7 is a partial sectional view of the construction of the box bottom 13. A wrapping layer 16 is seen to be the outermost layer, and may be made of decorative paper. The middle layer 17 is a heavy cardboard layer, while the inner layer 18 is a coating of wax or plastic to render the box bottom 13 free from potential damage from spilt water.

OPERATING PRINCIPLES

The two levels of the indicator means 24 seen in FIG. 3, relate to the elevation of the tree stand from the floor relative to the elevation of the vessel. The upper indicator 25 is noted at a point corresponding to approximately 1 inch below the top of the stand. The second marking 26 which is at a lower relative elevation corresponds in elevation to the elevation of the tubing entry into the stand 41, per FIG. 5. The water level in the vessel 20 should always be kept somewhere between the two indicator lines. Since the operating principle of this invention is the siphoning of water from the vessel to the stand, and since it is known that water seeks its own level, one can control and prevent overflow of fluid in the stand, by not putting water above the pre-measured elevation of the stand, which elevation corresponds to the pre-measured set point of the higher indicator setting 25 on indicator means 24. By not filling the vessel above set point 25, one will never overflow the capacity of the stand should it become filled with water. This of course presupposes that the user measure the elevation of the stand's top edge or lip to avoid overflow.

As water is absorbed from the water present in the stand, the water level therein will recede. If the water level in the stand drops below the elevation of the point of entry of the tubing into the stand; namely, 43, the siphon delivery capability of the container 13 to deliver water to the stand will be terminated according to basic physics principles.

Therefore during the period of the presence of the Christmas tree on the stand peg 45, the user must make sure that the water level in the vessel 20 never drops below the lower set point, 26, and that upon adding water to the vessel the water level never exceeds the upper set point 25 such as not to overfill the stand.

Preferably the vessel disposed in the container 11 is set at a higher elevation or at least the same elevation as the tree stand in order to assure the flow of fluid via this siphon, from the elevation of point 25 down to the elevation of point 26.

If the water level in the stand due to tree consumption falls below the entry point of the tubing into the stand, water flow will cease as the suction will have been broken.

The sight means 15, if present in the container bottom 13, should be in visual alignment with the indicator means 24 such that it will not be necessary to remove the box top 12 to determine how much fluid has been consumed by the tree. Preferably, for the benefit of smooth water flow, the opening in the container and opening in the vessel for the disposition of the tubing should be substantially in the same horizontal plane when the vessel is in the container.

The benefit of the watering system of this invention is the fact that it works with the millions of commercial Christmas tree stands in inventory of the various tree lots nationwide. Many of these stands come with a hold already drilled into the sidewall, usually of about a 1" diameter, such that a hose can be temporarily place within the stand to fill it with water, a first time. If not present at the time of purchase the lot owners, usually will punch or drill such a bore in the sidewall of the stand. By providing a grommet 43 sized to fit the same dimension opening 41, the stand operator can have the option of employing the watering system of this invention or not as he/she so chooses. If the choice is not do so, such as on December 24$^{th}$ prior to shut down, a tapered plug 49 seen in FIG. 5 can be inserted into the opening 43 to seal the opening 41 against leakage.

For ease and convenience it is seen to be within the skill of the artisan to provide hinges for the box top to pivot from a closing position on the box bottom for the easy addition of water to the vessel 20.

While certain connection points have been indicated to be threaded engagements, it is seen that the use of friction it connections instead is contemplated as a suitable alternative.

While the thrust of the discussion has centered on the watering of Christmas trees, obviously the package could be wrapped as a Birthday, Eater or other holiday present, and the tree need not be a tree, it could be a bush to be watered by the apparatus of this invention.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. A Christmas tree watering apparatus comprising:
   (a) a Christmas tree stand defining a basin having a base and a continuous sidewall, said base having a pointed pin upstanding therefrom for the securement of a Christmas tree, said sidewall having an opening therein, for the receipt of tubing,
   (b) a container comprising a separate box top and a separate water resistant box bottom, having a vessel for holding water removably disposed therein, said vessel being open at the top, and having a continuous sidewall and a floor, said sidewall including both a fluid level indicator means, and an opening, having an annular member therein, located at the lower end thereof,
   tubing fluidly connected at one end from the lower end of said vessel, disposed through an opening in the container for said vessel, and fluidly connected at the other end to an opening in the basin to permit water to flow from the vessel to the basin,
   wherein the fluid level indicator means has two fluid level markers, each of which level markers corresponds to one of the two levels of the water; the upper of which corresponds in elevation to about 1" below the elevation of the top of the basin, and the second corresponds to the elevation of the tubing entry into the basin, such that the user knows to keep the water level between the two level markers to ensure no interruption in flow.

2. The Christmas tree watering apparatus of claim 1 wherein the opening in the container and the opening in the vessel are in the same horizontal plane, when the vessel is in the container.

3. The Christmas tree watering apparatus of claim 1 wherein the container comprises a separate box top and a separate box bottom appropriately decorated to simulate a present.

4. The Christmas tree watering apparatus of claim 1 wherein the vessel is open at the top and is made of plastic.

5. The Christmas tree watering apparatus of claim 1 wherein the threaded annular member of the opening of the opening of the vessel further includes a threaded cap adapted to close off said opening upon removal of the fluidly connected tubing.

6. In the apparatus of claim 1 further including sight means in the container to permit viewing of the fluid level in the vessel.

* * * * *